Oct. 5, 1937.  A. G. MURDOCH  2,094,806
APPARATUS FOR TESTING SPORTS IMPLEMENTS
Filed Jan. 31, 1935   2 Sheets-Sheet 1

INVENTOR
Alexander Gemmell Murdoch
B. Singer
ATTORNEY

Patented Oct. 5, 1937

2,094,806

UNITED STATES PATENT OFFICE 2,094,806

APPARATUS FOR TESTING SPORTS IMPLEMENTS

Alexander Gemmell Murdoch, London, England

Application January 31, 1935, Serial No. 4,394
In Great Britain February 2, 1934

3 Claims. (Cl. 265—1)

This invention relates to apparatus for indicating or for comparing the "feel" or "balance" of sports implements such as tennis and other rackets, hockey and other sticks, golf and other clubs, cricket and other bats, and other like or similar implements.

Apparatus to this end has been proposed comprising pivoted counterbalancing and indicating means together with means to receive the handle end of the implement with the striking portion projecting away from the pivot, but in no case does such apparatus determine the moment about the actual extremity of the handle end of the implement, but rather the moment about a position coming at a distance from such actual extremity. True moments for implements or for the comparison of implements cannot therefore be obtained due to the effect of the substantially fixed or constant portion of the implement coming between the pivotal axis and the actual extremity of the handle end with respect to the remaining portion of the implement or diverse implements.

Apparatus in accordance with the present invention, comprises means for ascertaining the moment of the implement about the extremity of the end by which it is held in use, and such apparatus can be utilized for comparing the moments of two implements or of one implement with a standard implement.

Many forms of apparatus may be devised for carrying out the invention, and in such apparatus it is preferred so to arrange the mechanism that the shaft, handle or the like of an implement being tested or compared forms the whole or an extension of a balance arm.

Thus, where the apparatus comprises one balance arm, this may be comprised wholly or partly by the shaft or the like, the moment being indicated by suitable spring or weight means in counter-balancing relation therewith. Where two balance arms are used, one may be comprised wholly or partly by the shaft or the like and the other by a weighted or spring-controlled arm, or this other may also be comprised wholly or partly by the shaft or the like of another implement.

In general, for practically carrying the invention into effect, pivoted means are provided in which the implement is definitely positioned or mounted so that while the extremity of its handle end comes adjacent the axis, it projects away from the axis and is caused to turn with the pivoted means, whilst other means, such as weights, spring means, a further balance arm, or any combination thereof, or otherwise, is provided to indicate the moment of, or to balance or counter-balance the said implement.

In order that the invention may be more clearly understood, it will now be described with reference to the accompanying drawings, which show various testing devices according to the invention, and in which:—

The various embodiments shown on the drawings are designed particularly for determining the balance, "feel" or moment of a golf club, but it will readily be understood that constructions of a similar nature may be used for testing similar properties of sports implements of various kinds, such as tennis rackets, hockey sticks, cricket bats and such like.

Figure 1:
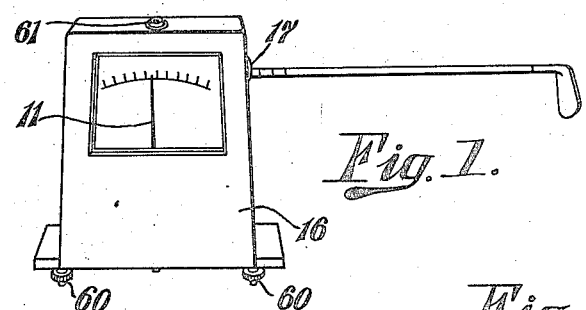
Fig. 1 is a general view of an embodiment of the invention.
Figure 2:
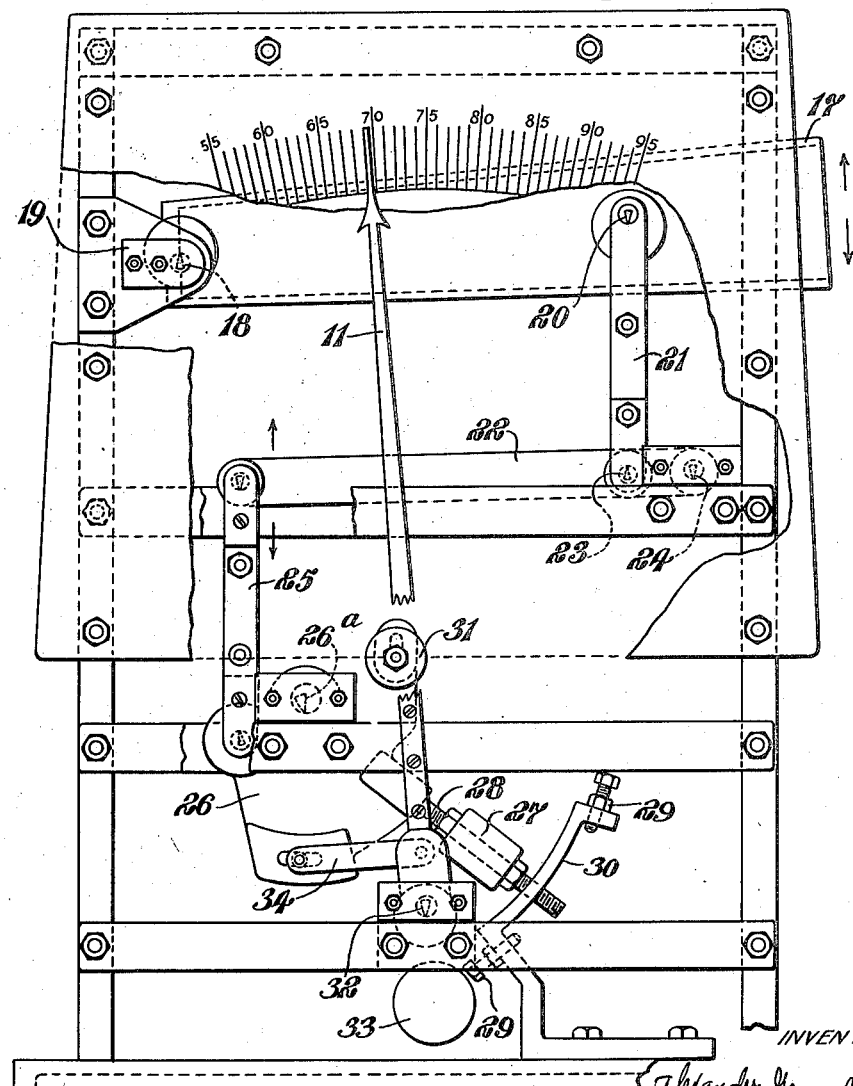
Fig. 2 is a detailed enlarged view of the embodiment of Fig. 1 with part of the front cut away to show the internal mechanism.
Figure 3:
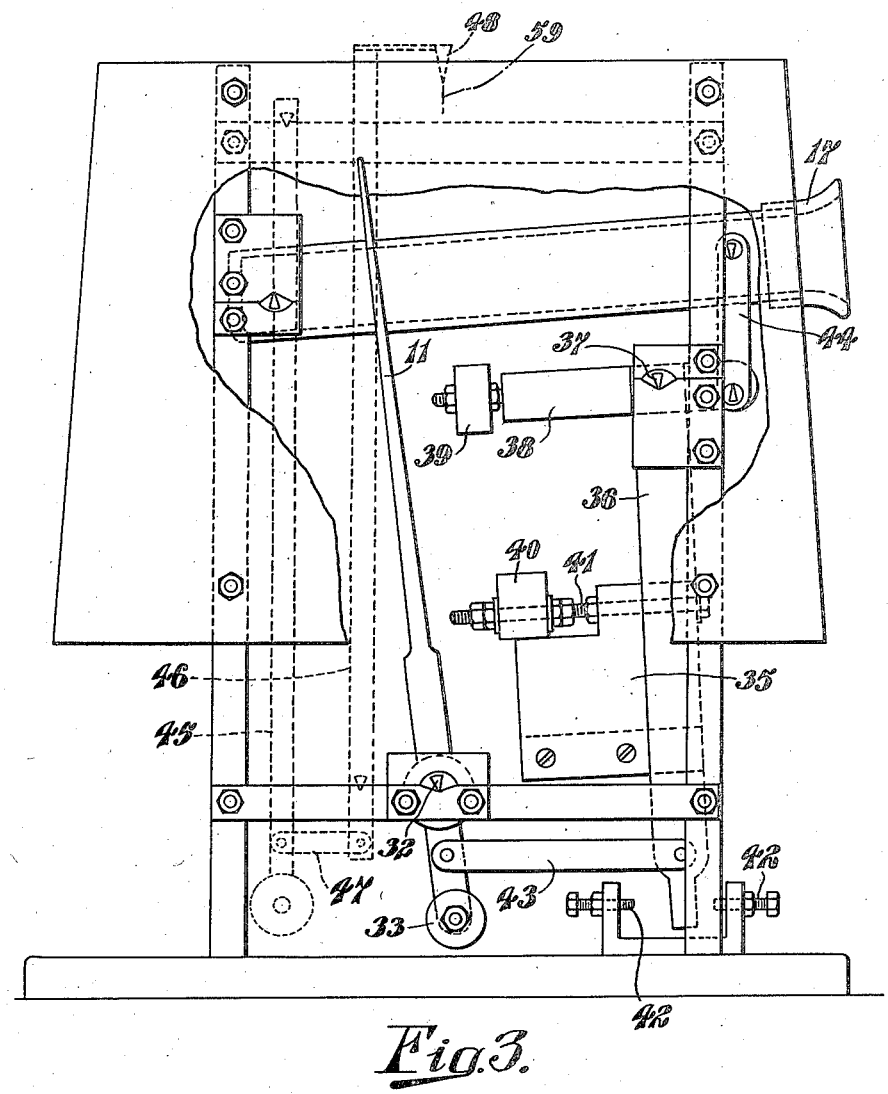
Fig. 3 is a view similar to Fig. 2 of a variation of the arrangement shown in Figs. 1 and 2.

The embodiments described in Figs. 1 to 3 are of the direct-reading type, that is to say an indication of the "feel", balance or moment of the implement to be tested can be read directly on the scale, the club removed and any necessary adjustment made, and then the club can be re-tested and the operation continued until the reading has the desired value. This result is obtained by causing the moment of the club or the like to act against a counter-balancing member adapted to exert a progressively increasing return force, such as a spring or a pivoted weight.

As shown in Fig. 1, the instrument comprises essentially a casing 16 provided with a glass window behind which a pointer 11 moves in front of a suitably graduated scale.

In the construction of Fig. 2, a more or less horizontally arranged, pivotally mounted socket 17 is provided, the free extremity of which may project, for example, through a slot in the side of the casing 16. The said socket 17 is conveniently of flattened cylindrical or coned form and embodies a closed end against which the extremity of the handle of the implement to be tested can rest. The socket 17 is provided with knife edges 18 adjacent the closed end thereof, said knife edges bearing upwardly against a suitable bracket support 19 on the fixed frame of the apparatus. A further knife edge 20 on the socket 17 bears against a link 21 in turn actuating another link 22 by means of another knife edge 23 in such a way that an amplified movement is applied to the free extremity of the link 22. The latter link is itself pivoted about another knife edge 24 bearing against a bracket or like support on the fixed frame.

Screws 60 may be provided for levelling the instrument and a spirit level, plumb line or pendulum arrangement for determining when correct levelling has been obtained.

Another link 25 connects link 22 to a pivotally mounted return weight structure 26, the latter resting, by means of knife edges 26ª, on the frame. Said structure 26 may comprise a counter weight 27 adjustable on a screwed spindle 28, said spindle being adapted to move between adjustable stop members 29 supported in a suitable bracket 30. A further weight 31, which may be adjustable or interchangeable, also forms part of the return weight structure 26. A pointer 11 is provided, which is pivotally mounted, by means of a knife edge 32, on the frame, and embodies a balance weight 33 at its lower end. Said pointer 11 is linked in an adjustable manner to the return weight structure 26 by a member 34.

A consideration of the linkwork structure will show that the application of a force, acting downwardly, to the socket member 17 will transmit the said force through the links 21, 22 and 25 to the return weight structure 26 and movement will be applied to the latter to an extent depending on the force exerted on socket 17. Any movement there may be, is then transmitted by member 34 to the pointer 11 which moves over a suitably graduated scale, which can be seen from the outside of the case 16. The end of the member 34 may be adjustably secured to a slot in the return weight structure 26 for the purpose of adjusting the reading or calibration of the pointer 11.

The method of using this apparatus will readily be appreciated, the club or other article to be tested is inserted in the open end of the socket 17 until the extremity of the handle abuts against the closed end of the said socket. A reading is then given on the scale by the pointer 11, which indicates the properties of the implement to be estimated. If this reading has not the required value, the properties of the implement may then be altered in any suitable way and it may then be retested to ascertain if the desired results have been obtained.

In the modified form of Fig. 3, the socket 17 is here shown of cylindrical form and provided with a flaring mouth portion. The return weight structure in this case comprises a mass 35 supported from a pendular rod 36 pivoted by a knife edge 37 to a fixed part of the frame. A lateral projecting part 38 is provided on the pendular rod adjacent the pivoting point thereof, and a weight 39, which may be adjustable in position, is provided at the extremity of the part 38. A further weight 40, adjustable in position, may be mounted on a screwed rod 41 and attached to the mass 35. The lower end of the pendular rod 36 is adapted to move between limits comprised by two stop members 42 and is linked to the lower end of a pointer 11 by a member 43. The said pointer 11 may be pivoted to the frame by means of a knife edge 32 and the lower end of the said pointer can be provided with a counterweight 33. A suitable link 44 serves to connect the socket member 17 to a lateral projection from the pendular rod 36, knife edges being provided on the said socket and on said lateral projection which bear against receiving surfaces in the said link 44.

It is important to secure an exactly correct levelling of the instrument. To this end, and as hereinbefore described, a number of levelling screws 60, preferably three, may be provided, together with means for determining when the instrument is in the correct position. This means may comprise, for example, a spirit level 61 (as shown in Fig. 1) or, as shown on Fig. 3 in dotted lines, a pendulum 45 is supported towards the top of the instrument and the said pendulum is linked to an upwardly extending member 46 by means of a short link 47 located comparatively close to the point of pivoting of rod 46. Thereby the movement of the pendulum 45 is applied to rod 46, which at its upper end carries an indicating pointer 48 adapted to indicate correct levelling in relation to a fixed indicating point or line 59 on the casing. It will be understood that the indicator 48 follows the movement of the pendulum 45 to a greatly amplified extent, thereby forming a very sensitive indicator of the levelling of the instrument.

As will be realized, a great variety of sports implements and shafts, handles and parts thereof can be tested and graduated by apparatus according to the invention, but it is particularly suitable for such purposes in conjunction with striking implements for balls and the like. It may be applied to all kinds of rackets, such as those for tennis, badminton and squash, to all varieties of "sticks", such for example as those for hockey, lacrosse or polo, to bats, such for example as cricket bats, to clubs, for example those used in golf and baseball, to croquet mallets, and otherwise. It is, as will be realized, of extreme importance for all sports implements which, when used, depend upon the angular momentum about the portion or end by which they are gripped or held.

Apparatus according to the invention is not limited to the precise forms or details of construction described, as these may be varied in many ways according to convenience and precise requirements for the purpose of indicating, comparing or determining the moments of the implements about, or substantially about, the ends by which they are held in action.

What I claim and desire to secure by Letters Patent of the United States of America is:—

1. Mechanism for testing the feel or balance of sports implements such as golf clubs or rackets, comprising a bearing, a tubular socket to receive and support the handle of the implement under test, pivotal means carried by one end of the tubular socket for mounting in said bearing, stop means to position the extremity of the said handle in alignment with the pivoting axis of said tubular socket, linkage means connected at one end to said tubular socket at a point removed from its pivoting axis, pivoted counter-balance means for said tubular socket and to which the other end of said linkage means is connected, a pivoted pointer for indicating the movement of said pivoted counter-balance means and linkage means connecting said pivoted pointer and pivoted counter-balance means.

2. Mechanism for testing the feel or balance of sports implements such as golf clubs or rackets, comprising a bearing, a tubular socket to receive and support the handle of the implement under test, pivotal means carried by one end of the tubular socket for mounting in said bearing, stop means to position the extremity of the said handle in alignment with the pivoting axis of said tubular socket, a lever pivoting about a fixed fulcrum, linkage means between the said lever and a point on said tubular socket removed from its pivoting axis, pivoted counter-balance means for said tubular socket, linkage mechanism between the said lever and the said pivoted counter-balance means, a pivoted pointer for indicating the movement of said pivoted counter-balance means and linkage means connecting said pivoted pointer and counter-balance means.

3. Mechanism for testing the feel or balance of sports implements such as golf clubs or rackets, comprising a bearing, a tubular socket to receive and support the handle of the implement under test, pivotal means carried by one end of the tubular socket for mounting in said bearing, stop means to position the extremity of the said handle in alignment with the pivoting axis of said tubular socket, a lever pivoted about a fixed fulcrum, a counter-balance means for said tubular socket which means is carried by the said pivoted lever, linkage means connecting said lever to the tubular socket at a point removed from the pivoting axis thereof, a pivoted pointer for indicating the movement of said counter-balance means and linkage means connecting said pivoted pointer and the lever carrying the counter-balance means.

ALEXANDER GEMMELL MURDOCH.